United States Patent
Neff et al.

(10) Patent No.: US 9,748,823 B2
(45) Date of Patent: Aug. 29, 2017

(54) LINEAR ACTUATOR WITH MOVING CENTRAL COIL AND PERMANENT SIDE MAGNETS

(71) Applicants: Edward A. Neff, Cardiff-by-the-Sea, CA (US); Taon M. Vu, San Diego, CA (US); Andrew Gladoch, San Marcos, CA (US); Mark Cato, Escondido, CA (US); Tomas Simunovic, Vista, CA (US)

(72) Inventors: Edward A. Neff, Cardiff-by-the-Sea, CA (US); Taon M. Vu, San Diego, CA (US); Andrew Gladoch, San Marcos, CA (US); Mark Cato, Escondido, CA (US); Tomas Simunovic, Vista, CA (US)

(73) Assignee: Systems Machine Automation Components Corporation

( * ) Notice: Subject to any disclaimer, the term of this patent is extended or adjusted under 35 U.S.C. 154(b) by 396 days.

(21) Appl. No.: 13/927,078

(22) Filed: Jun. 25, 2013

(65) Prior Publication Data
US 2014/0159513 A1    Jun. 12, 2014

Related U.S. Application Data

(60) Provisional application No. 61/664,111, filed on Jun. 25, 2012.

(51) Int. Cl.
*H02K 15/00* (2006.01)
*H02K 41/02* (2006.01)
(Continued)

(52) U.S. Cl.
CPC ............. *H02K 15/00* (2013.01); *H02K 15/14* (2013.01); *H02K 41/02* (2013.01); *H02K 41/031* (2013.01); *Y10T 29/49009* (2015.01)

(58) Field of Classification Search
CPC ...... H02K 41/031; H02K 41/00; H02K 15/14; H02K 15/00
(Continued)

(56) References Cited

U.S. PATENT DOCUMENTS 4,488,242 A   12/1984   Tabata et al.
4,576,421 A   3/1986    Teramachi
(Continued)

FOREIGN PATENT DOCUMENTS

DE   2217958 A1    10/1973
EP   0 556 469 A1   8/1993
(Continued)

OTHER PUBLICATIONS

International Search Report and Written Opinion for International Application No. PCT/US2015/014133, mailed Apr. 29, 2015, 8 pages.

(Continued)

*Primary Examiner* — Burton Mullins
(74) *Attorney, Agent, or Firm* — Cooley LLP

(57) ABSTRACT

A linear actuator, comprising a base housing, a top housing, and a piston assembly. The base housing may include at least one recess configured to restrain at least one magnet in three dimensions and a channel configured to receive a linear guide. The top housing may be fixedly attached to the base housing and may include at least one recess configured to restrain another at least one magnet in three dimensions. The piston assembly may include at least one coil bobbin, a shaft, a linear encoder scale, and a flex cable, wherein the piston assembly may be positioned between the base housing and the top housing.

9 Claims, 9 Drawing Sheets

(51) Int. Cl.
    *H02K 15/14* (2006.01)
    *H02K 41/03* (2006.01)
(58) Field of Classification Search
    USPC .............. 310/156.08, 156.21, 12.24, 154.03,
        310/154.07, 154.13, 154.16, 12.02, 12.33
    See application file for complete search history.

(56) References Cited

U.S. PATENT DOCUMENTS

| | | | |
|---|---|---|---|
| 4,616,886 A | 10/1986 | Teramachi | |
| 4,693,676 A | 9/1987 | Inaba | |
| 4,745,589 A | 5/1988 | Nomura | |
| 4,799,803 A | 1/1989 | Tanaka | |
| 4,804,913 A | 2/1989 | Shimizu et al. | |
| 4,808,955 A | 2/1989 | Godkin et al. | |
| 4,857,786 A * | 8/1989 | Nihei .................. | H02K 1/17 310/12.17 |
| 4,858,452 A | 8/1989 | Ibrahim | |
| 5,051,635 A | 9/1991 | Kasahara | |
| 5,053,670 A | 10/1991 | Kosugi | |
| 5,111,088 A | 5/1992 | Fujino | |
| 5,160,865 A | 11/1992 | Gururangan | |
| 5,175,456 A | 12/1992 | Neff et al. | |
| 5,225,725 A | 7/1993 | Shiraki et al. | |
| 5,270,625 A | 12/1993 | Neff | |
| 5,317,222 A * | 5/1994 | Neff et al. .................. | 310/13 |
| 5,376,862 A | 12/1994 | Stevens | |
| 5,446,323 A | 8/1995 | Neff et al. | |
| 5,450,050 A * | 9/1995 | Ban .................. | B60L 13/03 104/286 |
| 5,476,324 A | 12/1995 | Takei | |
| 5,501,498 A | 3/1996 | Ulrich | |
| 5,594,309 A | 1/1997 | McConnell et al. | |
| 5,685,214 A | 11/1997 | Neff et al. | |
| 5,722,300 A | 3/1998 | Burkhard et al. | |
| 5,751,075 A * | 5/1998 | Kwon .................. | H02K 1/27 310/12.24 |
| 5,834,872 A | 11/1998 | Lamb | |
| 5,859,482 A * | 1/1999 | Crowell et al. .................. | 310/58 |
| 5,893,646 A | 4/1999 | Mizutani et al. | |
| 5,952,589 A | 9/1999 | Leung et al. | |
| 6,091,167 A | 7/2000 | Neff et al. | |
| 6,118,360 A | 9/2000 | Neff | |
| 6,223,971 B1 | 5/2001 | Sato | |
| 6,439,103 B1 | 8/2002 | Miller | |
| 6,741,151 B1 | 5/2004 | Livshitz et al. | |
| 6,848,164 B2 * | 2/2005 | Jung .................. | H02K 1/27 29/596 |
| 6,907,651 B1 | 6/2005 | Fisher et al. | |
| 6,997,077 B2 | 2/2006 | Kollmann et al. | |
| 7,053,583 B1 | 5/2006 | Hazelton | |
| 7,168,748 B2 | 1/2007 | Townsend et al. | |
| 7,482,717 B2 | 1/2009 | Hochhalter et al. | |
| 8,083,278 B2 | 12/2011 | Yuan | |
| 8,498,741 B2 | 7/2013 | Ihrke et al. | |
| 2003/0009241 A1 | 1/2003 | Kruger et al. | |
| 2004/0076348 A1 | 4/2004 | Dalessandro et al. | |
| 2005/0211512 A1 | 9/2005 | Fenwick | |
| 2005/0234565 A1 | 10/2005 | Marks et al. | |
| 2005/0253469 A1 | 11/2005 | Hochhalter et al. | |
| 2006/0023980 A1 | 2/2006 | Kato et al. | |
| 2006/0113847 A1 | 6/2006 | Randall et al. | |
| 2008/0157607 A1 | 7/2008 | Scheich et al. | |
| 2008/0258654 A1 | 10/2008 | Neff | |
| 2009/0040247 A1 | 2/2009 | Cato et al. | |
| 2009/0058198 A1 | 3/2009 | Finkbeiner et al. | |
| 2009/0058581 A1 | 3/2009 | Neff et al. | |
| 2009/0114052 A1 | 5/2009 | Haniya et al. | |
| 2009/0152960 A1 | 6/2009 | Kimura et al. | |
| 2009/0261663 A1 | 10/2009 | Aso et al. | |
| 2009/0278412 A1 | 11/2009 | Kimura et al. | |
| 2010/0005918 A1 | 1/2010 | Mizuno et al. | |
| 2010/0133924 A1 | 6/2010 | Neff et al. | |
| 2010/0203249 A1 | 8/2010 | Elgimiabi | |
| 2010/0274365 A1 | 10/2010 | Evans et al. | |
| 2011/0068595 A1 | 3/2011 | Ihrke et al. | |
| 2012/0043832 A1 | 2/2012 | Neff et al. | |
| 2012/0080960 A1 | 4/2012 | Neff et al. | |
| 2014/0159407 A1 | 6/2014 | Neff et al. | |
| 2014/0159408 A1 | 6/2014 | Neff et al. | |
| 2014/0159514 A1 * | 6/2014 | Neff et al. .................. | 310/12.33 |
| 2015/0171723 A1 | 6/2015 | Neff et al. | |
| 2015/0303785 A1 | 10/2015 | Neff et al. | |
| 2016/0013712 A1 | 1/2016 | Neff et al. | |

FOREIGN PATENT DOCUMENTS

| | | | |
|---|---|---|---|
| EP | 1278109 | 1/2003 | |
| GB | 645281 A * | 10/1950 | ............... F41B 6/00 |
| JP | 61-116964 A2 | 6/1986 | |
| JP | 04-181562 | 6/1992 | |
| JP | 03285554 A | 12/1992 | |
| JP | A 06-260332 | 4/1994 | |
| JP | 07-015942 | 1/1995 | |
| JP | 07-131967 A | 5/1995 | |
| JP | 2000-152592 A | 5/2000 | |
| JP | 2001-238427 A | 8/2001 | |
| JP | 2001-286121 A2 | 10/2001 | |
| JP | 2004-332935 | 11/2004 | |
| JP | 2005-020901 A | 1/2005 | |
| JP | A 2005-080415 | 3/2005 | |
| JP | 2008-048556 A | 2/2008 | |
| JP | 2008-155302 A2 | 7/2008 | |
| JP | 2008-193845 A2 | 8/2008 | |
| JP | 2010-178614 A | 8/2010 | |
| KR | 10-2008-0090040 | 10/2008 | |
| KR | 20-2011-0003488 | 4/2011 | |
| KR | 10-2011-0139434 | 12/2011 | |
| WO | WO 2007/026566 A1 | 3/2007 | |
| WO | WO 2007/063729 A1 | 6/2007 | |
| WO | WO 2009/116343 A1 | 9/2009 | |
| WO | WO 2009/117827 | 10/2009 | |
| WO | WO 2011/088964 A1 | 7/2011 | |
| WO | WO 2015/117095 | 8/2015 | |
| WO | WO 2015/154026 | 10/2015 | |

OTHER PUBLICATIONS

International Search Report and Written Opinion for International Application No. PCT/US2015/024341, mailed Jul. 15, 2015, 10 pages.
International Search Report and Written Opinion for International Application No. PCT/US2015/054314, mailed Jan. 22, 2016, 10 pages.
"DC Motor Driver Fundamentals", TND6041/D, Semiconductor Components Industries, LLC, 2014, pp. 1-9.
"Moving coil motor technology", Maxon Precision Motors (http://machinedesign.com/motion-control/moving-coil-motor-technology), 1 page.
EP Application No. 14191347.5, Extended European Search Report dated May 4, 2015, 7 pages.
http://news.thomasnet.com/fullstory/455177, "Actuator and Ball Spline come in mini and micro sizes", 5 pages, Downloaded Aug. 7, 2015.
http://www.lunabearings.com/won.htm, "Compact Ball Spline", 6 pages, Downloaded Aug. 7, 2015.
PCT/US2008/052121, International Search Report and Written Opinion mailed Aug. 6, 2008, 5 pages.
PCT/US2008/052121, International Preliminary Report on Patentability mailed Jul. 28, 2009, 5 pages.
PCT/US2008/071988, International Search Report and Written Opinion mailed Nov. 3, 2008, 5 pages.
PCT/US2008/071988, International Preliminary Report on Patentability mailed Feb. 2, 2010, 5 pages.
PCT/US2011/053070, International Search Report and Written Opinion mailed Feb. 16, 2012, 6 pages.
PCT/US2011/053070, International Preliminary Report on Patentability mailed Mar. 26, 2013, 5 pages.

(56) References Cited

OTHER PUBLICATIONS

PCT/US2011/053070, International Search Report and Written Opinion mailed Feb. 16, 2012, 3 pages.
PCT/US2013/047727, International Search Report mailed Oct. 16, 2013, 3 pages.
PCT/US2013/047727, Written Opinion mailed Oct. 16, 2013, 4 pages.
PCT/US2013/047727, Preliminary Report on Patentability mailed Dec. 31, 2014, 5 pages.
PCT/US2013/047728, International Search Report mailed Oct. 16, 2013, 3 pages.
PCT/US2013/047728, Written Opinion mailed Oct. 16, 2013, 6 pages.
PCT/US2013/047728, Preliminary Report on Patentability mailed Dec. 31, 2014, 7 pages.

\* cited by examiner

LINEAR ACTUATOR WITH MOVING CENTRAL COIL AND PERMANENT SIDE MAGNETS

CROSS-REFERENCE TO RELATED APPLICATIONS

This application claims priority under 35 U.S.C. 119(e) to U.S. provisional application No. 61/664,111, entitled LOW-COST, REDUCED DIAMETER LINEAR ACTUATOR, filed on Jun. 25, 2012, the content of which is hereby expressly incorporated by reference in its entirety for all purposes.

FIELD

This invention relates generally to linear actuators and, more particularly, to linear actuators of reduced diameter and lower manufacturing costs.

BACKGROUND

Linear actuators are mechanical devices which are used to perform repetitive actions requiring linear motion. For example, linear actuators can be used in an assembly plant for placing caps on bottles, for automatically stamping or labeling mail, for glass cutting, for placing electronic components on printed circuit boards, for testing various buttons or touch areas on electronic devices, for automation, and for a wide variety of other purposes as well.

In plants designed to assemble electronic devices, actuators are used to, for example, pick up and move components provided by a parts feeder or similar apparatus. In modern printed circuit board assembly lines, the center points of the smallest parts feeder stations are separated by a distance, or pitch, of slightly less than 8 mm. Thus, in order for two actuators to be paired with two adjacent part feeder stations arranged at an 8 mm pitch, each of the actuators must have a diameter of less than 8 mm in order to enable components to be retrieved from the adjacent parts feeders and properly placed upon on circuit boards.

Typically, enterprises involved in the electronic assembly of devices comprised of small parts utilize pneumatic actuators, or "slides", to manipulate such parts. Although pneumatic slides are generally inexpensive, the component parts used in, for example, various electronic or industrial devices can be so small and fragile that compressed air pneumatic slides may cause damage when placing such parts on a circuit board due to the friction forces that must be overcome to achieve actuation in typical compressed air pneumatic slides. Further, pneumatic slides are known to have a somewhat limited lifetime, and may sometimes last less than 10M cycles.

In contrast, magnetic actuators typically enjoy a longer lifetime than pneumatic slides. In addition, magnetic actuators can be designed to "soft-land" and control the applied force, thereby reducing the risk of part breakage. Examples of such actuators can be found in U.S. Pat. No. 5,952,589 entitled "Soft Landing Method For Probe Assembly," assigned to the assignee of the present application and incorporated by reference herein in its entirety. However, magnetic actuators can be expensive to manufacture.

SUMMARY

Exemplary embodiments of the disclosed low-cost, reduced-diameter linear actuator are shown in the drawings are summarized below. These and other embodiments are more fully described in the Detailed Description section. It is to be understood, however, that there is no intention to limit the disclosure to the forms described in this Summary or in the Detailed Description. One skilled in the art can recognize that there are numerous modifications, equivalents and alternative constructions that fall within the spirit and scope of the methods and apparatus defined by the claims.

In one variation, a linear actuator comprises a base housing, a top housing, and a piston assembly. The base housing may define at least one recess configured to restrain at least one magnet in three dimensions and a channel configured to receive a linear guide. The top housing may be fixedly attached to the base housing and the top housing may define at least one recess configured to restrain another at least one magnet in three dimensions. The piston assembly may comprise at least one and up to six or more coil bobbins, a shaft, a linear encoder scale, and a flex cable, wherein the piston assembly may be positioned between the base housing and the top housing. The shaft can be configured to include a flat end defining a hole such that the shaft can be screwed to the piston assembly in a top-down fashion.

In one aspect, a linear actuator comprises a base housing defining a channel and at least one recess configured to restrain at least a first magnet. A linear guide is attached to the base housing and positioned in the channel. A top housing is fixedly attached to the base housing, wherein the top housing defines at least one recess configured to restrain at least a second magnet. The linear actuator further includes a movable assembly including at least a piston and at least one coil bobbin, wherein the movable assembly is attached to the linear guide and positioned between the base housing and the top housing and wherein one or more wire coils of the at least one coil bobbin are in one or more planes parallel to a line of motion of the movable assembly.

In a further aspect, a method of manufacturing a linear actuator includes attaching at least one magnet into at least one recess formed in a base housing wherein an inner surface of the base housing defines the at least one recess and a channel. The method further includes attaching a linear guide to the base housing, the linear guide being positioned in the channel. In addition, the method includes attaching a movable assembly to the linear guide, the movable assembly comprising a piston and at least one coil bobbin. A top housing may be attached to the base housing, the top housing comprising another at least one magnet restrained in at least one recess defined by the top housing, the top housing being attached such that the magnets, the movable assembly and the linear guide are positioned between the base housing and the top housing.

In yet another aspect, a linear actuator comprises a base housing and a linear guide attached to the base housing. The linear actuator further includes a top housing fixedly attached to the base housing, wherein the top housing and the base housing are configured to restrain at least a first magnet and a second magnet. The linear actuator also includes a movable assembly attached to the linear guide and positioned between the base housing and the top housing, wherein the moveable assembly includes at least one coil bobbin and wherein one or more wire coils of the at least one coil bobbin are in one or more planes parallel to a line of motion of the movable assembly.

In another variation, a method of manufacturing a linear actuator comprises constructing a base housing, a top housing, and a piston assembly. The base housing may define at least one recess (e.g., circular, square or rectangular) configured to receive glue to restrain at least one magnet (e.g., a square magnet) in three dimensions and a channel configured to receive a linear guide, and the base housing may be constructed to be a steel casting using a mold that defines the recesses and channel. The top housing may comprise at least one recess (e.g., circular, square or rectangular in shape) configured to receive glue to restrain another at least one magnet in three dimensions, wherein the top housing is constructed to be a steel casting. The piston assembly may be constructed from a plastic mold and may be constructed to receive at least one and up to six or more coil bobbins, a shaft, a linear encoder scale, and a flexible cable. The shaft can be configured to include a flat end defining a hole such that the shaft can be screwed to the piston assembly in a top-down fashion.

It is to be understood that both the foregoing general description and the following detailed description are exemplary and are merely intended to provide further explanation of the subject matter.

BRIEF DESCRIPTION OF THE DRAWINGS

Various objects and advantages and a more complete understanding of the linear actuator of the present invention are apparent and more readily appreciated by reference to the following Detailed Description and to the appended claims when taken in conjunction with the accompanying Drawings wherein:

Figure 1:
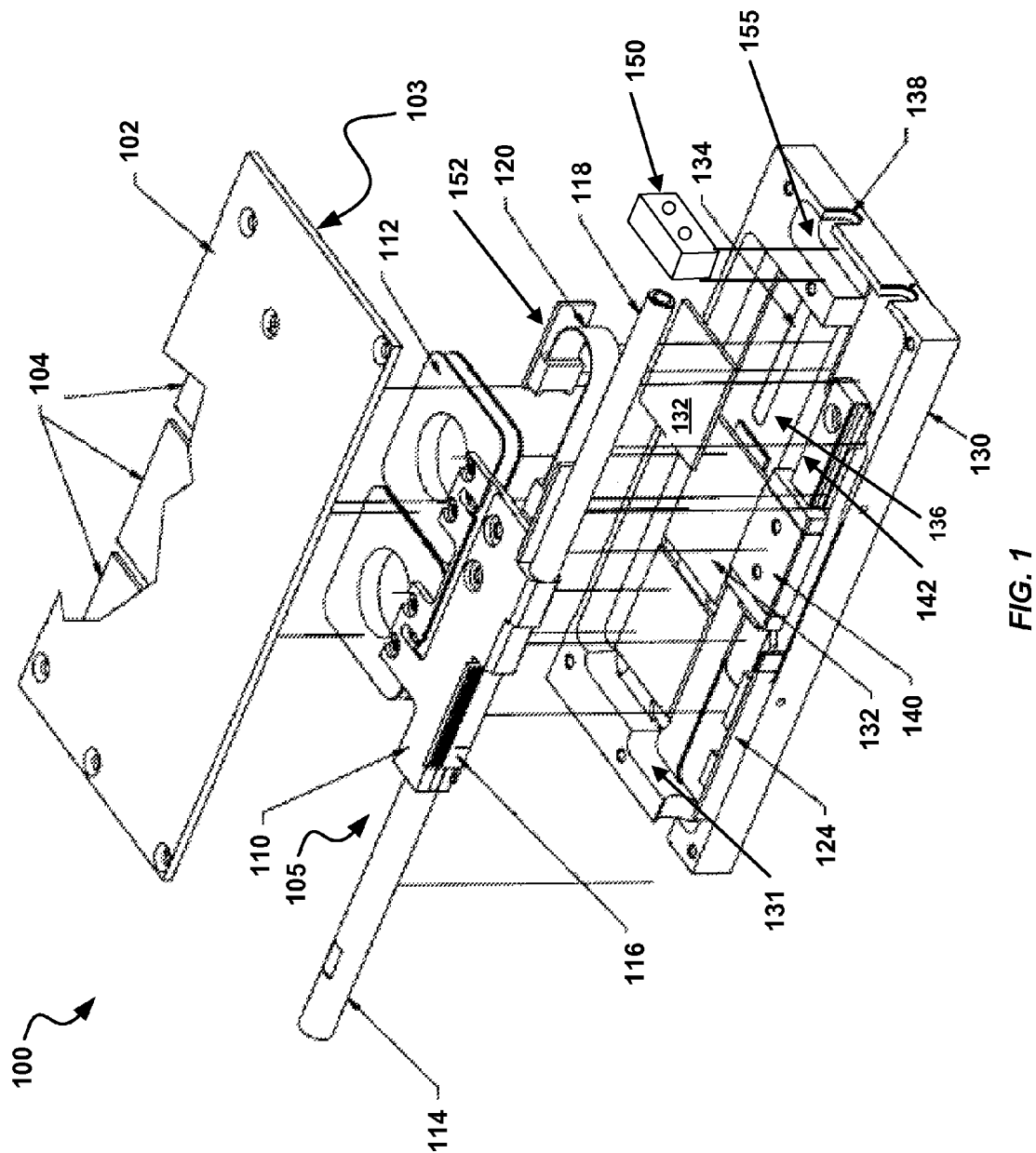
FIG. 1 illustrates an exploded view of a linear actuator in accordance with the disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Reference will now be made in detail to aspects of the subject linear actuator and related methods, examples of which are illustrated in the accompanying drawings, wherein like reference numerals refer to like elements throughout.

Disclosed herein are reduced-diameter linear actuators and methods of manufacturing such actuators at low cost. The linear actuators disclosed herein may allow for reduced manufacturing cost by, for example, reducing the number of parts required, reducing the cost of machining the parts, and reducing the cost of assembling the parts.

FIG. 1 illustrates an exploded view of a linear actuator 100. Linear actuator 100 may include a top magnet housing 102 and a base housing 130. Top magnet housing 102 may define recesses (not shown) on an inside surface 103 for receiving at least one magnet 104. In FIG. 1, top magnet housing 102 is partially cut away to reveal the at least one magnet 104. The recesses may be contoured within the surface 103 to allow the at least one magnet 104 to "snap" into place, that is, to physically restrain the at least one magnet 104 in three dimensions once the linear actuator 100 has been assembled. Thus, the at least one magnet 104 may be easily assembled in top housing 102 without a need for location tooling. The top magnet housing 102 may also include grooves for receiving epoxy to bond the magnets 104 in position.

Top magnet housing 102 may be manufactured as a steel casting using a mold. Simple machine finishing of about 0.1 mm may be added to create the finished component.

Base housing 130 can be a steel casting formed with a mold. The mold used to make the base housing 130 can be configured to be adjustable for providing variable length base housings with longer or shorter strokes. In one embodiment, the same mold can be used to fabricate housings with five or more different length strokes. Base housing 130 may also define recesses (not shown) on an inside surface 136 for receiving at least one magnet 132. The recesses may be contoured to allow the at least one magnet 132 to "snap" into place, that is, to physically restrain the at least one magnet 132 in three dimensions once the linear actuator 100 is assembled. Thus, the at least one magnet 132 may be easily assembled in base housing 130 without a need for location tooling. The base magnet housing 130 may also include grooves 134 for receiving epoxy to bond the magnets in position. The base housing 130 is configured such that the magnets 132, the glue, a linear guide 140 slidably mounted on a rail 142, and a cable assembly 150 can be assembled via vertical placement from the top down. The base housing 130 may also include an aperture 138 for receiving an interface cable, such as a cable for a suction pump.

As an alternative to recesses configured such that the magnets 104 and 132 can snap into place, the recesses can be configured to be larger than the magnets 104 and 132 and/or a different shape than the magnets 104 and 132. In this alternative configuration, the magnets 104 and 132 can be glued into place with the glue being deposited in the recesses themselves which can be about 100 microns deep. For example, the recesses could be circular and dimensioned such that the square magnets 104 and 132 fit into the circular recesses. Circular recesses are more easily machined than square or rectangular recesses.

The top housing 102, the base housing 130 and the magnets 104 and 132 combine to form what is referred to as a magnetic circuit. The top housing 102 and the base housing 130, referred to collectively as a magnetic circuit steel, serve as return lines to interconnect the magnets 104 and 132 of the magnetic circuit and to help contour the magnetic field. Previous actuator designs have utilized a separate interior housing to support magnets. In addition, previous actuator designs have utilized separate end plates and/or side plates. In contrast, the linear actuator 100 uses only the top housing 102 and the base housing 130 to mount the magnets where the base housing 130 defines the sides and ends of the linear actuator 100. This one housing design can be used due to, at least in part, the light weight of the moving parts and the small size of the magnets 104 and 132 the of the linear actuator 100.

Base housing 130 may combine the magnet circuit steel with a section holding a movable assembly 105 comprised of, for example, a piston 110, one or more coil bobbins 112, two shafts 114 and 118, a flexible cable 120 and a linear encoder scale 116. The configuration of the movable assembly 105 may advantageously reduce the number of parts and reduce manufacturing costs. In one embodiment the coil bobbins 112 may be plastic molded. The coil bobbins 112 and two shafts 114 and 118 are connected to the piston 110 prior to assembly and combined unit comprised of piston 110 and bobbin 112 of the movable assembly 105 is attached to the linear guide 140 using screws. This attachment may proceed in a downward vertical motion perpendicular to the inner surface 136 of the base housing 130. The coil bobbins 112 are flat coils with the coil windings parallel to the travel of the piston 110 on the linear guide 140. Previous actuators have used coils where the windings were at right angles to the direction of travel. By utilizing flat coils, the thickness of the linear actuator 100 may be reduced. For example, in one embodiment the linear actuator 100 with flat coils can be 8 mm thick or even less, thereby being small enough to be used for placing electronic parts where pitch between electronic parts can be 8 mm. The piston 110 can also be configured to mount three coil bobbins 112. By providing options for 2 coil or 3 coil versions, the linear actuator 100 can be controlled using either a single-pole or multi-pole controller as described below.

The movable assembly 105 can be assembled in a top-down fashion. In one embodiment, the coil bobbins 112 are wound from the top-down during the assembly of the movable assembly. In this embodiment, a bottom plate includes two posts on which the coil bobbins 112 are wound from the top. A top plate is then coupled to both posts securing the coil bobbins together in the movable assembly 105.

Base housing 130 may also define a machined channel for receiving the rail 142 on which the linear guide 140 is slidably mounted. The channel may include a datum location and the rail 142 may positioned in relation to this datum location. In one embodiment linear guide 140 comprises a commercially available linear guide such as, for example, the LWL manufactured by IKO®, having an expected lifetime in a range of 1OOM cycles. Thus, linear actuator 100 may be expected to have a useful lifetime substantially longer than the lifetime of conventional pneumatic slides.

Base housing 130 includes a location for a linear encoder reader head 124. The linear encoder reader head 124 may be positioned in reference to the datum location. The linear encoder reader head 124 is assembled such that it is located at a precise distance from the datum location. In this way, when the movable assembly 105 is also assembled in relation to the datum location, the linear encoder reader head 124 is positioned at a precise distance (e.g., 0.5 mm within a combined tolerance of +/−0.1 mm) from the linear encoder scale 116 that is on the movable assembly 105. The linear encoder reader head 124 is configured to read the linear encoder scale 116 positioned on the movable assembly 105.

Some or all of the features of base housing 130 such as, for example, recesses, grooves, apertures, channels, and a location for a linear encode reader head, may by machined at the same time. In one embodiment, horizontal milling is used to machine these features. The base housing 130 can be screwed to a surface of the milling machine as a means for clamping the base housing 130 during assembly. This simple method of restraint can improve tolerance control since the base housing is not indexed during machining of these critical features. The mold which may be used to form the base housing 130 can be configured such that the various recesses and glue grooves (if present) are formed by the casting process. In this way, less machining is required to ensure very tight tolerances for the locations and dimensions of the recesses, grooves and screw holes. For example, in one embodiment the dimensions of the base housing 130 can be machined to within +/−10-20 microns. In addition, the casting mold can be dimensioned such that the recesses and grooves can be formed to these very tight tolerances by removing about 200-300 microns of material or less. The use of a casting with tight tolerances advantageously allows the various interior parts of the linear actuator 100 to be placed using simple drop and place techniques, thereby reducing the time and cost of manufacture.

The piston 110 may be injection molded from machinable plastic or be made out of aluminum, either by using a casting mold or being extruded. The front edge and bottom edge of the piston 110 are machined precisely since these two surfaces control the position of the piston 110 relative to the datum location when the piston 110 is mounted on the linear guide 140 and the rail 142 is mounted in relation to the datum location. The edge of the base housing 130 on which the reader head 124 is mounted is also machined precisely such that the combined tolerances of the two machined surfaces of the piston 110 and the edge of the base housing 130 are separated by a gap of about 0.5 mm+/−0.1 mm. The piston 110 may be configured to provide mounting positions to accommodate one, two, three or more coil bobbins 112 The piston 110 may be made out of injection molded plastic. The piston 110 may also include screw holes in order to facilitate its mounting on the linear guide 140 using screws. The plastic of the piston 110 may be machined to conform to the top surface of the linear guide 140. In contrast to plastic, aluminum pistons often increase the friction experienced by linear guides by bending or otherwise deforming the walls of such guides, thereby potentially reducing expected life. Thus, the use of a plastic-molded piston 110 may further prolong useful lifetime of embodiments of the linear actuator 110. As shown in FIG. 1, the piston 110 includes a bore for the shaft 114 and defines an area for the linear encoder scale 116.

Employing at least one coil bobbin 112 in lieu of the free standing coils typically used in small disc drive type actuators may advantageously reduce manufacturing time and avoid the need to glue coils into place. Coils may advantageously be automatically wound around the bobbins 112.

Again referring to FIG. 1, shaft 114 is attached to piston 110. In the embodiment of FIG. 1 the shaft 114 illustrated as a vacuum shaft, but in other variations the shaft 114 is solid. When shaft 114 comprises a vacuum shaft, a hole may be cut through the center of the shaft for vacuum pick up. Thru shaft vacuum 118 may facilitate vacuum pick up. A compression spring (not shown) may be mounted between the piston 110 and a front wall 131 of the base housing 130 to return the piston to a retracted position once power is cut or to counter balance a weight if the unit is mounted vertically, for example.

Piston 110 may also have a flex cable 120 for controlling various functions of the linear actuator 100. For example, the flex cable 120 may be used to provide power to the coils of the coil bobbins 112 or to facilitate communication between cable assembly 150 and the coil so that, for example, an external controller can control the rate and positioning of the shaft. The cable assembly 150 includes a connector board configured to couple to external cable that includes about 16 lines in the cable. The cable assembly 150 is mounted in a cavity 155 to be communicatively coupled to the flex cable 120 via an electrical connector 152. The cable assembly 150 can be mounted on the base housing 130 on two posts that are machined to precise heights so as to be aligned precisely. The cable assembly 150 is also able to be attached to the base housing 130 using a downward vertical motion perpendicular to the inner surface 136 of the base housing 130.

The various components of linear actuator 100 may include apertures and corresponding recesses for fixedly coupling different parts by use of screws, for example.

Because of the simple design of the individual parts of linear actuator 100, total manufacturing time for parts used in this device may be less than 15 minutes. Total assembly time, when performed manually, may be less than 5 minutes. Assembly of the linear actuator, since performed vertically down, lends itself easily to automation. Manufacturing cost may then be further reduced by 75%, as compared to a manual assembly.

These manufacturing and assembly times may cut production time by more than 75% compared to conventional linear servo motor actuators. As a result, the cost of manufacturing linear actuator 100 may be less than or equal to twice that of pneumatic slides.

In addition, the simple design may mean that this actuator can be a viable replacement for pneumatic slides because the expected ten times greater cycle life more than offsets the cost to the customer of less than or equal to twice that of a pneumatic actuator.

Pneumatic slides currently represent about 20% of the total yearly sales of pneumatic actuators. The low-cost, long-life development described advantageously enables customers to improve the quality of their machines both in terms of work done and mean time between failures.

Figure 2:
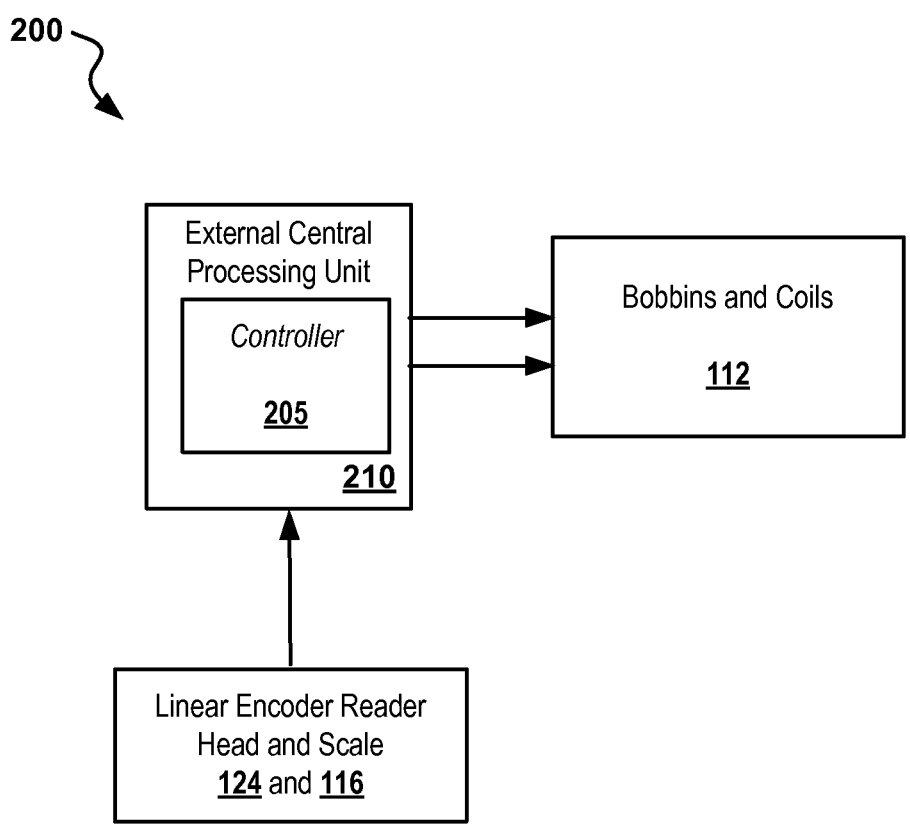
FIG. 2 depicts a block diagram of control components of a linear actuator in accordance with the disclosure.

FIG. 2 depicts a block diagram of control components 200 of the linear actuator 100. The control components include an external central processing unit 210, the coil bobbins 112 and linear encoder components including the linear encoder reader head 124 and the linear encoder scale 116. The external central processing unit 210 executes computer readable instructions embodying a controller 205.

During operation of the linear actuator 100, the controller 205 and the external central processing unit 210 operate to control an electric current provided to the coil bobbins 112. An electromotive force is supplied to the piston 110 by the interaction between the magnets 132 and 104 and an electromagnetic field generated in response to the provision of this electric current to the coil bobbins 112. This electromotive force can provide linear reciprocal movement to the entire movable assembly 105 including the piston 110, the bobbin coils 132, the shafts 114 and 118, the flexible cable 120 and the linear guide 140. The linear encoder read head 124, which attached to the base housing 130, and the linear encoder scale 116, which is attached to the piston 110, interact to provide a feedback signal to the external central processing unit 210 and the controller 205. The feedback signal tracks the linear motion of the movable assembly 105 and, hence, the shafts 114 and 118. Thus the controller 205 is able to selectively position the piston 110 along the entire path provided by the linear guide 140.

The controller 205 can be configured to use a single-pole control system (a linear version of a brush motor) for a linear actuator having two bobbin coils. The control system for the two coil version has only a single magnet circuit and therefore the electromotive force decreases over a longer stroke. The controller 205 can also be configured with a multiple-pole control system (a linear version of a brushless motor) for a linear actuator having three bobbin coils. For this multiple-pole control system, the electromotive forces generally stay the same over an entire stroke. For example, a single pole circuit could be utilized for strokes in a range of 10 mm to 15 mm and multi-pole circuits could be utilized for strokes greater than 15 mm.

Figure 3:
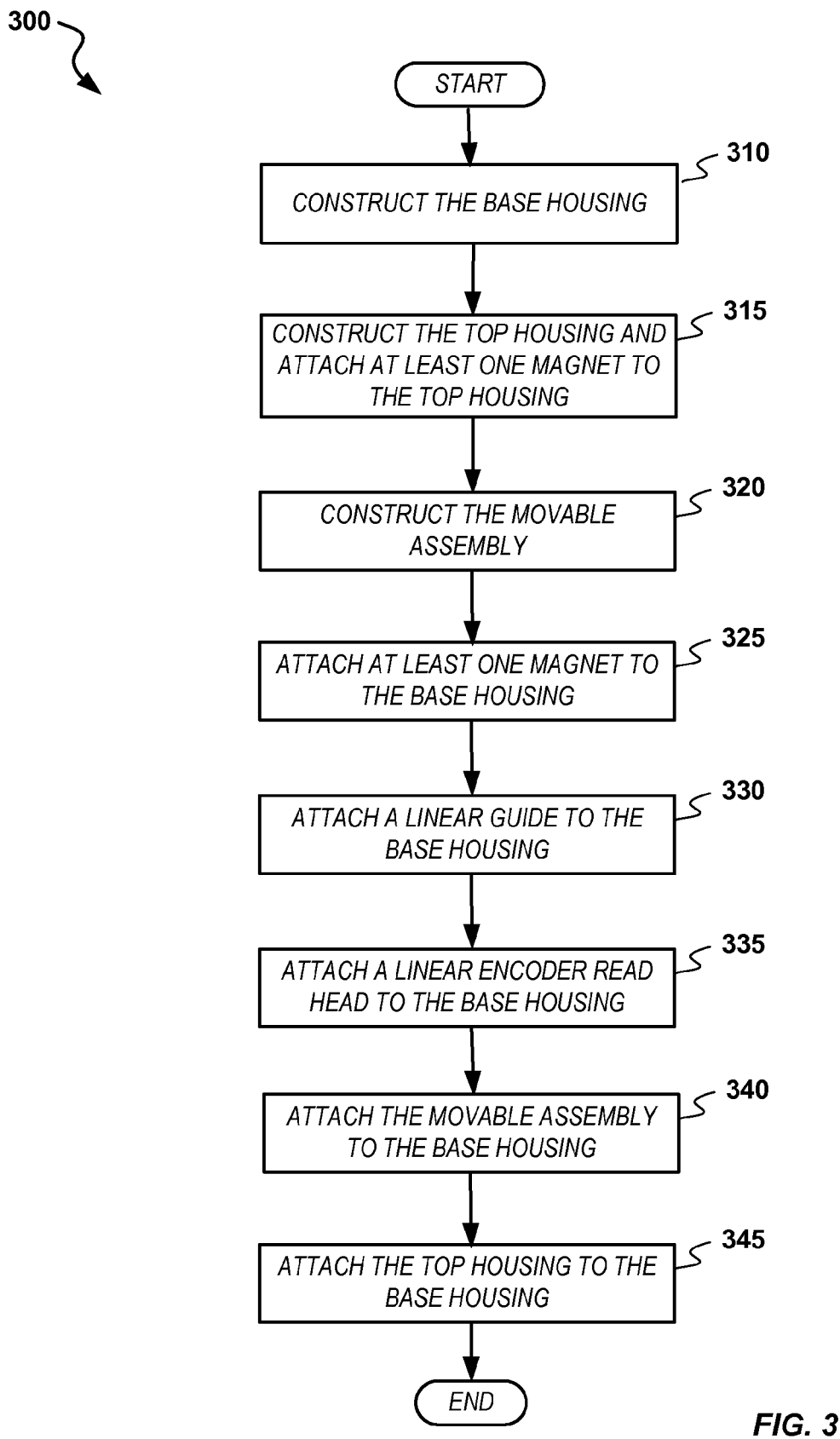
FIG. 3 is a flow diagram illustrating an exemplary process for manufacturing a linear actuator in accordance with the disclosure.

FIG. 3 shows and example of a flow diagram illustrating an exemplary process 300 for manufacturing a linear actuator in accordance with the disclosure. The process 300 can be used to manufacture the linear actuator 100 of FIG. 1. The process 300 starts at stage 310 with the base housing being constructed. The base housing can be constructed using a steel casting mold. The steel casting mold can be configured such that recesses, grooves and channels for attaching the other internal components are constructed, at least partially, during the casting process. The recesses, grooves and channels may require further machining, depending on the configuration and/or the desired tolerances. The base housing is configured such that the attachment of the internal components can accomplished using a linear motion in one direction, such as vertically as described above.

Figure 4A:
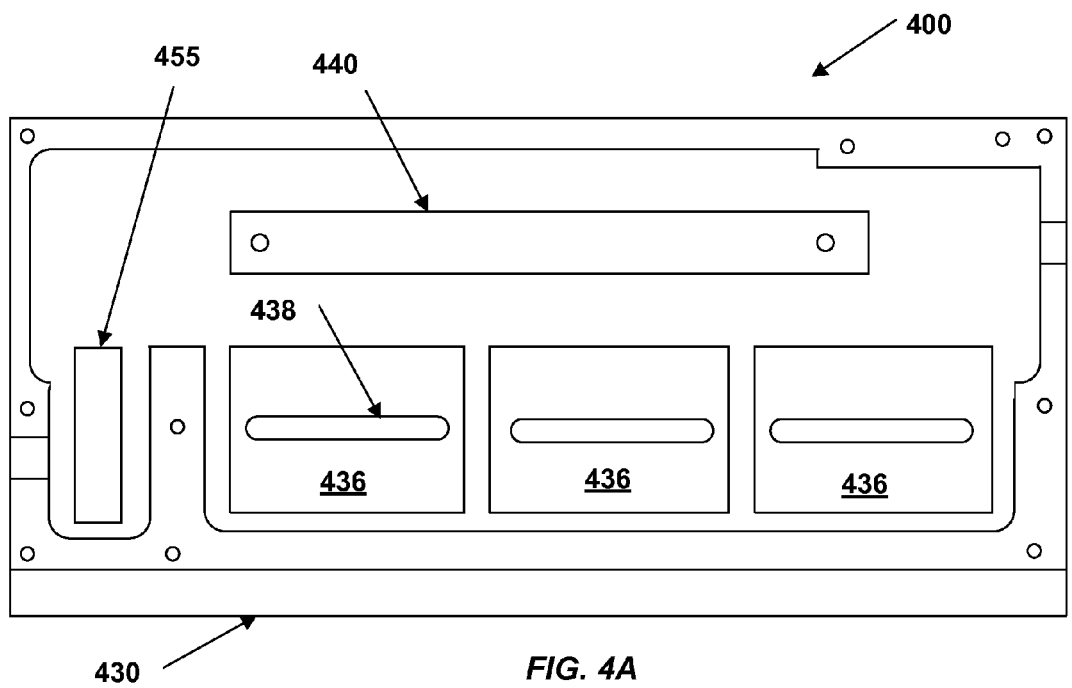
FIGS. 4A-4F provide schematic illustrations of various stages in a method of manufacturing a linear actuator in accordance with the disclosure.

FIG. 4A illustrates a base housing 430 constructed at stage 310 during construction of a linear actuator 400. The base housing 430 defines three recesses 436 for receiving three magnets. Each recess 436 is formed to include a glue groove 438 such that glue, e.g., epoxy, can be applied prior to the magnets being attached. The base housing 430 also defines a channel 440 for receiving a linear guide rail and a channel 455 for receiving a cable assembly. Rectangular recesses 436 are illustrated in FIG. 4A, but the recesses 436 could be other shapes including, for example, square, circular, etc.

Returning to FIG. 3, the process 300 continues to stage 315 with the construction of the top housing. The top housing is also constructed using a steel casting mold. The top housing is cast to define three recesses to receive three other magnets which are also attached to the top housing at stage 315.

At stage 320, the movable assembly is constructed. The movable assembly is constructed to include a piston, at least one bobbin coil, at least one shaft, a flexible cable and a linear encoder scale. In one embodiment, the movable assembly constructed at stage 320 is the movable assembly 105 described above.

Figure 4B:
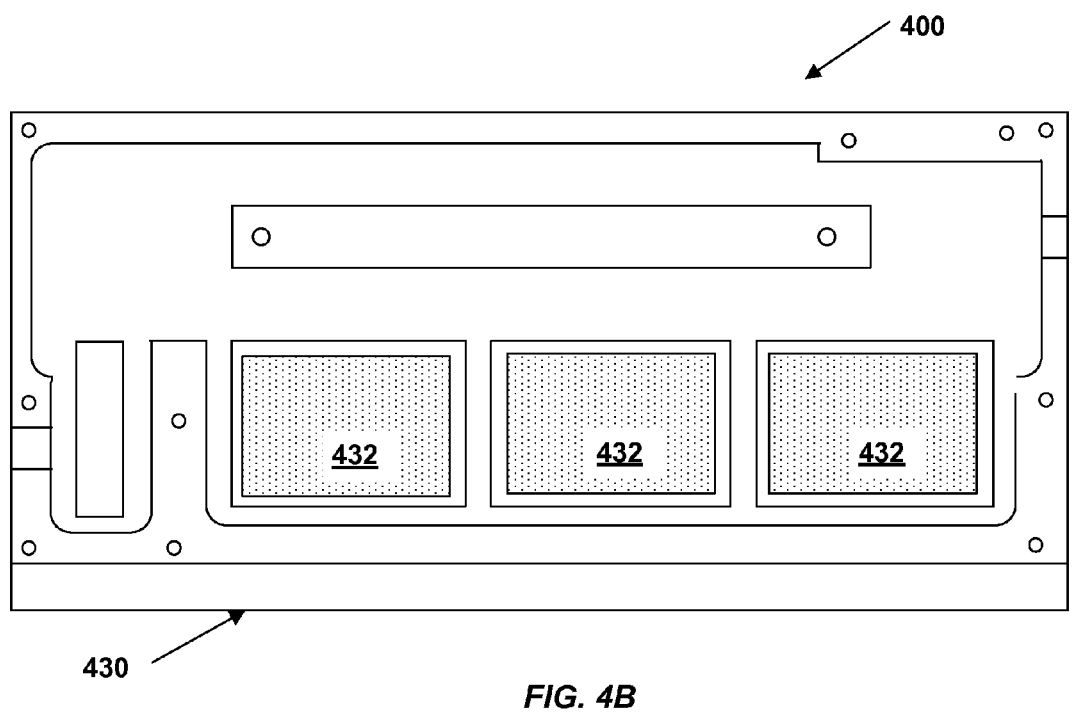

At stage 325 and in further reference to FIG. 4B, three magnets 432 are attached to the base housing 430 so as to be constrained in the recesses 436 in three dimensions. Depending on the configuration of the recesses 436, the magnets 432 can be snapped into place or glued. The magnets 432 and the glue, if needed, can be placed into the recesses 436 and the grooves 438 manually or using automated means for picking and placing parts. The design of the base housing 430 allows the placement of the magnets, and all other internal components, in a single direction perpendicular to a floor of the base housing 430.

Figure 4C:
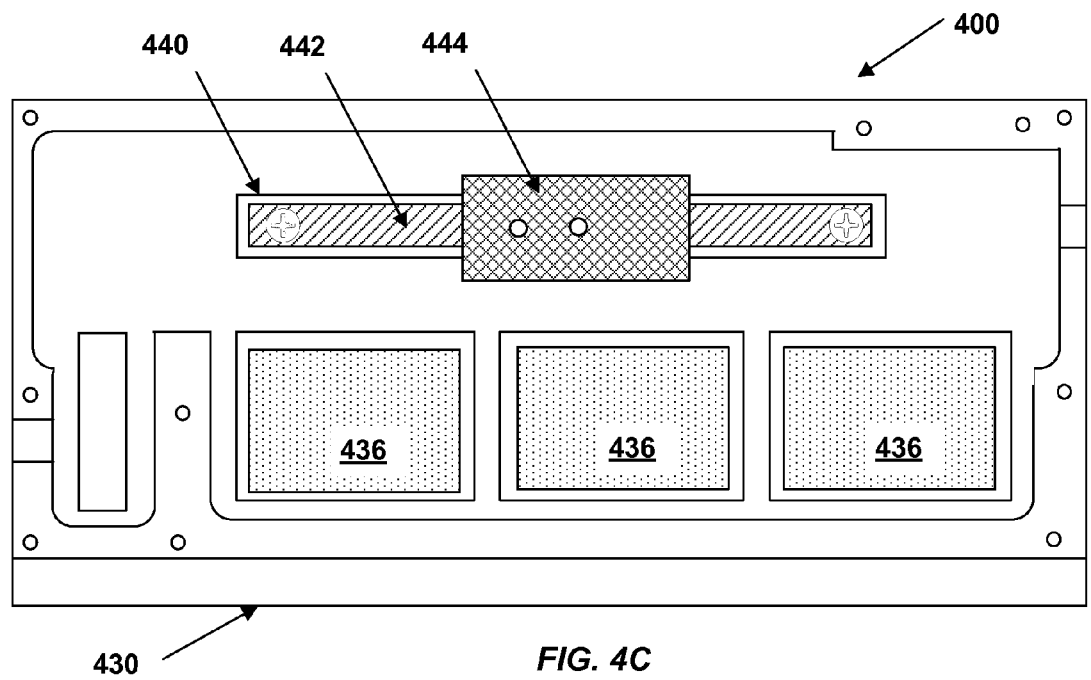

At stage 330, and in further reference to FIG. 4C, a linear guide 444 slidably coupled to a rail 442 is attached to the base housing 430 with two screws in the channel 440. The linear guide 444 and rail 442 could also be glued into the channel 440 in other embodiments.

Figure 4D:
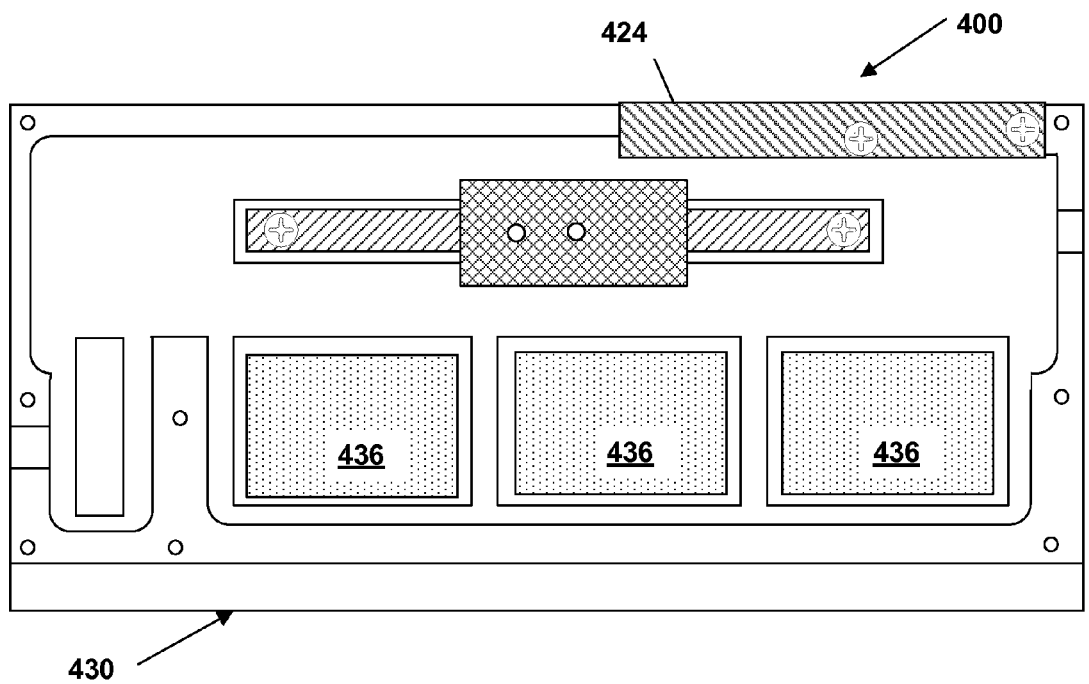

At stage 335, and in further reference to FIG. 4D, a linear encoder read head 424 is attached to a wall of the base housing 430 using two screws. The linear encoder read head 424 could also be attached using glue or other adhesives.

Figure 4E:
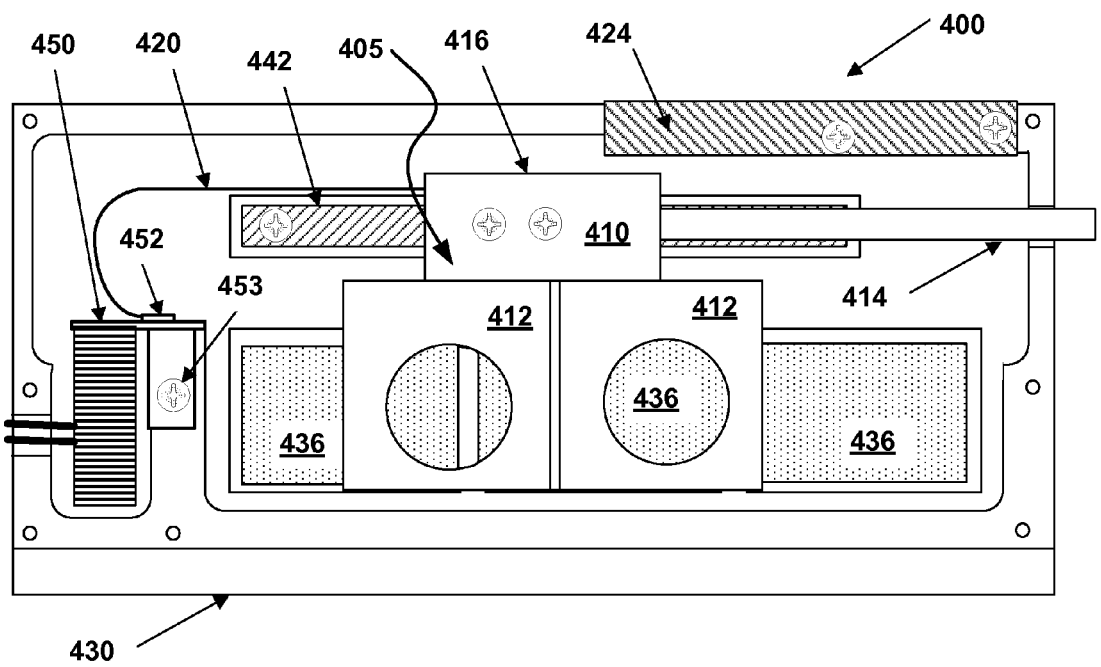

At stage 340, and in further reference to FIG. 4E, a movable assembly 405 (constructed at stage 320) is attached to the linear guide 444 with two screws. The movable assembly includes a piston 410, two bobbin coils 412, a shaft 414, a linear scale 416 and a flexible cable 420. The linear scale 416 is located so as to be readable by the linear encoder read head 424 as the piston 410 moves along the rail 442. FIG. 4E also shows a cable assembly 450 attached to the base housing with a screw 453 so as to be electrically connected to an electrical connector 452 of the flexible cable 420. The cable assembly 450 can be attached at the same time as the movable element 405 at stage 340 or at a different time. The cable assembly 450 is also electrically coupled to two wires that exit the base housing via a cutout to connect to an external central processing unit including a controller as discussed above in reference to FIG. 2.

Figure 4F:
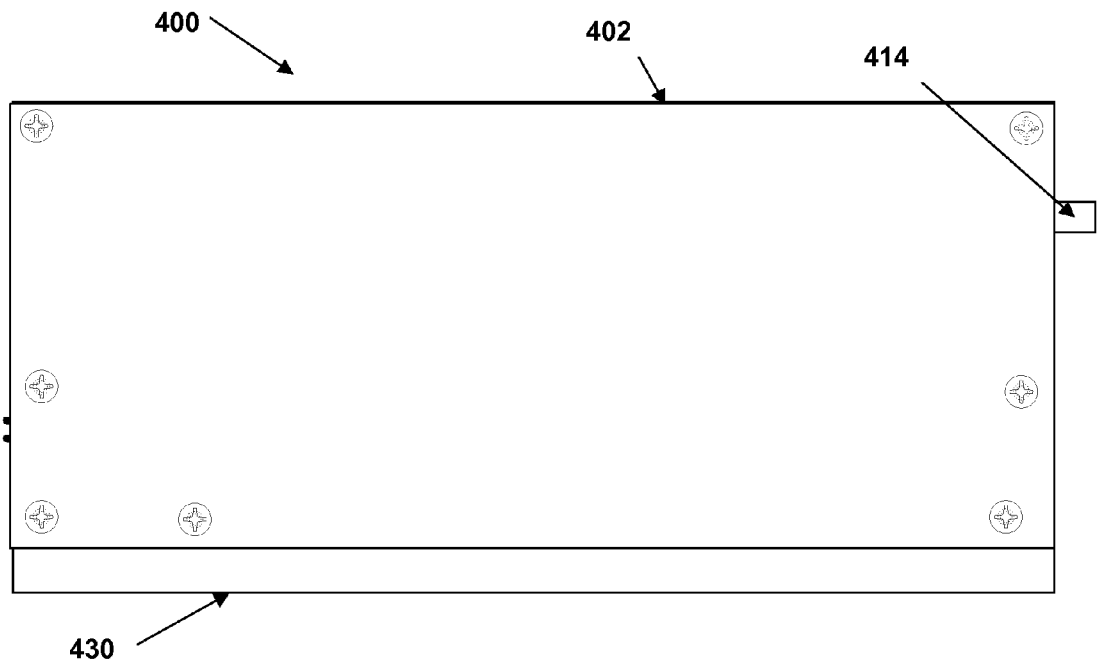

At stage 345, and in further reference to FIG. 4F, a top housing 402, that was constructed at stage 315, is attached to the base housing using seven screws in this example. The top housing 402 is attached to the base housing 430 such that the magnets attached to the base housing and the top housing are enclosed within the base housing 430 and the top housing 402. In addition, all the other components attached at the stages 325, 330, 335 and 340 are also enclosed between the base housing 430 and the top housing 402.

The linear actuator 400 constructed with the process 300 can be manufactured quickly and inexpensively due to the design of the base and top housings 430 and 402, and due to the layout of the components within the housings. All the components can be attached to the base housing, either manually or using automated means, using a simple linear motion in a single direction that is perpendicular to the floor of the base housing 430. In addition, the linear actuator 400 can be very thin, 8 mm or smaller, thereby being able to be used for manufacturing small components unsuitable for manipulation using larger actuators (electrical, pneumatic or other).

Figure 5A:
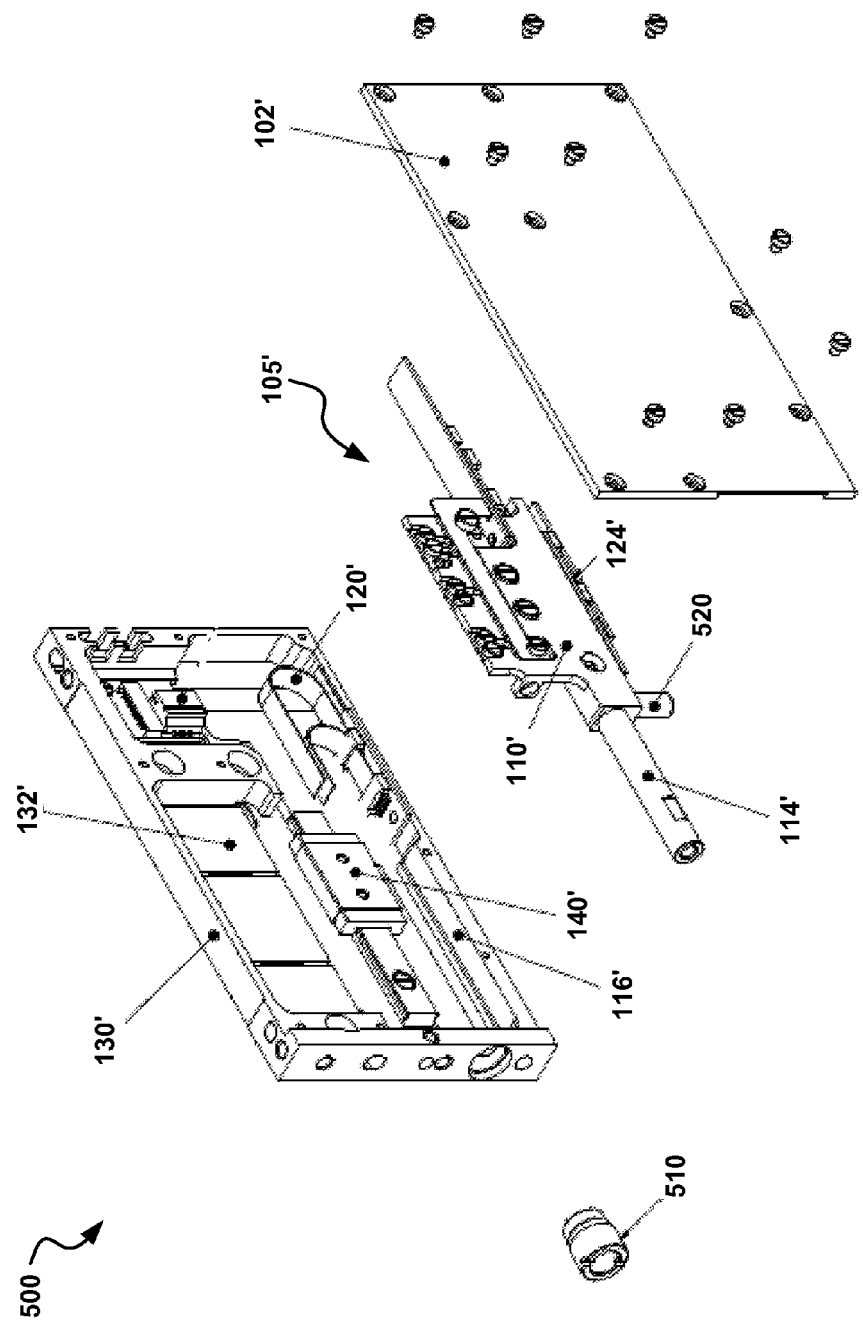
FIGS. 5A-5C depict various view of a linear actuator structured similarly to the linear actuator of FIG. 1.
Figure 5B:
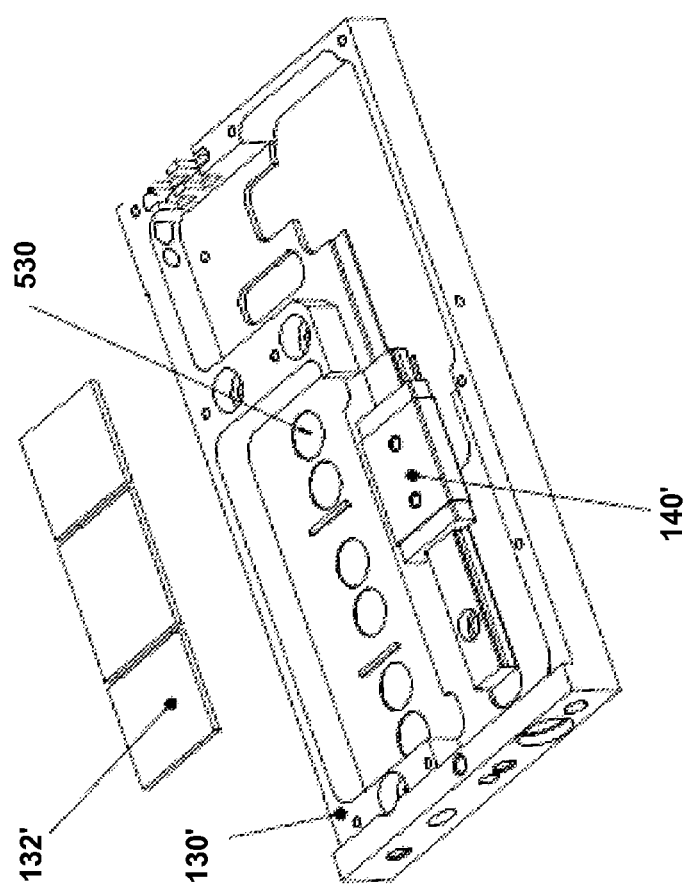
Figure 5C:
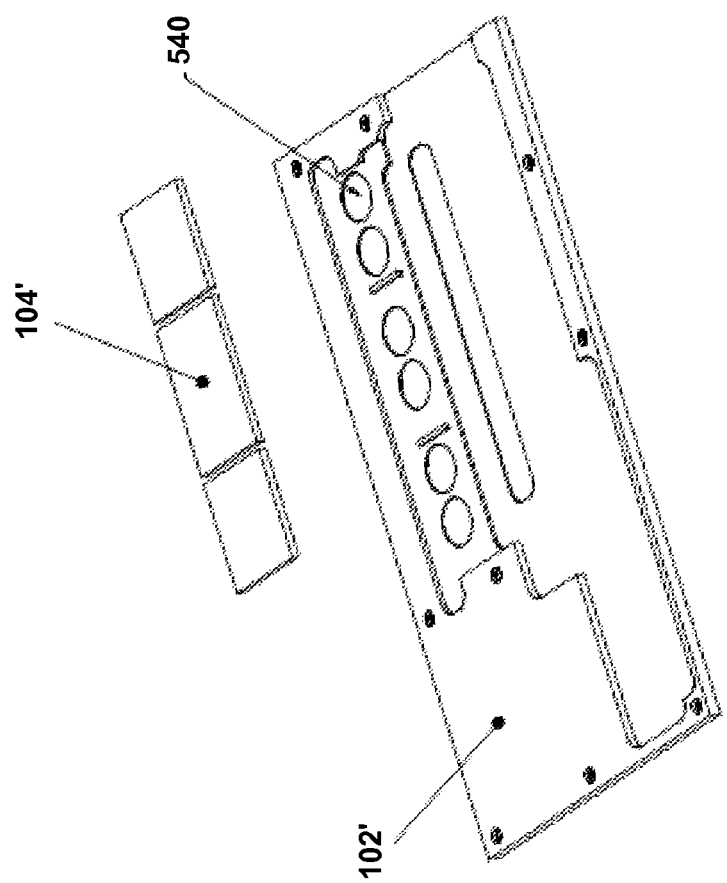

Attention is now directed to FIGS. 5A-5C, which depict a linear actuator 500 structured similarly to linear actuator 100. Accordingly, like reference numerals will be used in FIGS. 5A-5C to refer to corresponding elements of FIG. 1. For example, reference numeral 130' is used in FIG. 5A to identify the base housing structure corresponding to the base housing 130 of FIG. 1.

Turing to FIG. 5A, an exploded view is provided of the linear actuator 500. In addition to the primed reference numerals 105', 114', 120', 124', 132' and 140' used to identify elements corresponding to those described with reference to FIG. 1, the embodiment of FIG. 5A is seen to further include a bushing 510 insertable into the base housing 130' and a vacuum port 520 defined by the piston 110'.

FIG. 5B depicts a top view of the base housing 130' for the linear actuator 500. In addition to the elements of the base housing 130' identified in FIG. 5A, in one embodiment the base housing 130' further defines a plurality of epoxy pockets 530 for securing permanent magnets 132'.

FIG. 5C illustrates an inner surface of the top magnet housing 102' of the linear actuator 500. As shown, in one embodiment the top magnet housing 102' further defines a plurality of epoxy pockets 540 for securing permanent magnets 104'.

Various changes and modifications to the present disclosure will become apparent to those skilled in the art. Such changes and modifications are to be understood as being included within the scope of the present disclosure. The various embodiments of the invention should be understood that they have been presented by way of example only, and not by way of limitation. Likewise, the various diagrams may depict an example architectural or other configuration for the invention, which is done to aid in understanding the features and functionality that can be included in the invention. The invention is not restricted to the illustrated example architectures or configurations, but can be implemented using a variety of alternative architectures and configurations. Additionally, although the invention is described above in terms of various exemplary embodiments and implementations, it should be understood that the various features and functionality described in one or more of the individual embodiments are not limited in their applicability to the particular embodiment with which they are described. They instead can, be applied, alone or in some combination, to one or more of the other embodiments of the invention, whether or not such embodiments are described, and whether or not such features are presented as being a part of a described embodiment. Thus the breadth and scope of the invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known", and terms of similar meaning, should not be construed as limiting the item described to a given time period, or to an item available as of a given time. But instead these terms should be read to encompass conventional, traditional, normal, or standard technologies that may be available, known now, or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated. For example, "at least one" may refer to a single or plural and is not limited to either. The presence of broadening words and phrases such as "one or more," "at least," "but not limited to", or other like phrases in some instances shall not be read to mean that the narrower case is intended or required in instances where such broadening phrases may be absent.

The word "exemplary" is used herein to mean "serving as an example or illustration." Any aspect or design described herein as "exemplary" is not necessarily to be construed as preferred or advantageous over other aspects or designs.

It should be understood that the specific order or hierarchy of steps in the processes disclosed herein is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented. Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

In conclusion, the present invention provides, among other things, reduced-diameter linear actuators and reduced-cost methods of manufacturing those actuators. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosure as expressed in the claims.

What is claimed is:

1. A method of manufacturing a linear actuator, the method comprising:
   constructing a base housing comprising:
      at least one recess contoured to restrain at least one magnet in three dimensions,
      a channel configured to receive a linear guide;
   constructing a top housing comprising at least one recess configured to restrain another at least one magnet in three dimensions, wherein the top housing is constructed from a steel casting; and
   constructing a piston assembly from a plastic mold, wherein the piston assembly is constructed to receive at least one coil bobbin, a shaft, a linear encoder scale, and a flex cable wherein the at least one coil bobbin includes a flat coil with coil windings parallel to travel of the piston assembly.

2. The method of claim 1 wherein the at least one recess is configured to have a size and shape substantially the same as a size and shape defined by the at least one magnet in order to enable the at least one magnet to snap into place and wherein the step of constructing the top housing includes contouring at least one recess of the top housing to enable the another at least one magnet to snap into place.

3. The method of claim 1 wherein the top housing further includes grooves, the method further including placing epoxy in the grooves to bond the at least one magnet.

4. The method of claim 1 further including the step of depositing glue in the at least one recess.

5. The method of claim 1 wherein the linear actuator is of a thickness of 8 mm or less.

6. A method of manufacturing a linear actuator, the method comprising:
   constructing a base housing comprising:
      a first recess and a second recess different from the first recess, the first recess being contoured to restrain a first magnet in three dimensions and the second recess being contoured to restrain a second magnet in three dimensions,
      a channel configured to receive a linear guide rail;
   constructing a top housing comprising at least a third recess configured to restrain a third magnet in three dimensions, wherein the top housing is constructed from a steel casting;
   constructing a piston assembly wherein the piston assembly is constructed to receive at least one coil bobbin and wherein the at least one coil bobbin includes a flat coil with coil windings parallel to travel of the piston assembly.

7. The method of claim 6 wherein the piston assembly is positioned outside of the channel.

8. The method of claim 6 wherein the top housing further includes grooves for receiving epoxy to bond the at least one magnet.

9. The method of claim 6 wherein the step of constructing the base housing includes constructing the recesses and the channel using another steel casting.

* * * * *